(12) United States Patent
Cho et al.

(10) Patent No.: US 9,464,694 B2
(45) Date of Patent: Oct. 11, 2016

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Kangsoo Seo, Yongin-si (KR); Jae Chang Kook, Hwaseong-si (KR); Myeong Hoon Noh, Seongnam-si (KR); Seongwook Ji, Ansan-si (KR); Wookjin Jang, Yongin-si (KR); Seong Wook Hwang, Gunpo-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/807,533

(22) Filed: Jul. 23, 2015

(65) Prior Publication Data

US 2016/0169332 A1    Jun. 16, 2016

(30) Foreign Application Priority Data

Dec. 10, 2014    (KR) .................. 10-2014-0177360

(51) Int. Cl.
*F16H 3/66* (2006.01)

(52) U.S. Cl.
CPC .......... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC ............... F16H 2200/0065; F16H 2200/2046; F16H 2200/2012
USPC ......................................... 475/275–291, 330
See application file for complete search history.

(56) References Cited

U.S. PATENT DOCUMENTS

| | | | |
|---|---|---|---|
| 9,328,804 B1* | 5/2016 | Ji ............................. | F16H 3/66 |
| 2013/0072343 A1* | 3/2013 | Shim ........................ | F16H 3/66 475/276 |
| 2013/0203542 A1* | 8/2013 | Garcia ...................... | F16H 3/66 475/71 |
| 2014/0018204 A1* | 1/2014 | Mellet ...................... | F16D 25/06 475/275 |
| 2014/0106924 A1* | 4/2014 | Kienzle .................... | F16H 3/663 475/276 |

FOREIGN PATENT DOCUMENTS

| | | | | |
|---|---|---|---|---|
| DE | 102010063634 | * | 6/2012 | ............ F16H 3/666 |
| JP | 2013-204708 A | | 10/2013 | |
| KR | 10-2012-0132021 A | | 12/2012 | |
| KR | 10-2013-0000171 A | | 1/2013 | |
| KR | 10-1448789 B1 | | 10/2014 | |
| KR | 101459477 B1 | * | 11/2014 | ............... F16H 3/66 |

* cited by examiner

*Primary Examiner* — Roger Pang
(74) *Attorney, Agent, or Firm* — Morgan, Lewis & Bockius LLP

(57) ABSTRACT

A planetary gear train of an automatic transmission for a vehicle may include an input shaft into which power of an engine is input, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft, a second rotational shaft, a third rotational shaft, a fourth rotational shaft, a fifth rotational shaft, a sixth rotational shaft, a seventh rotational shaft, and an eighth rotational shaft.

6 Claims, 3 Drawing Sheets

FIG. 2

| Speed | B1 | B2 | B3 | C1 | C2 | C3 |
|-------|----|----|----|----|----|----|
| D1    |    | ●  | ●  |    | ●  |    |
| D2    | ●  |    | ●  |    | ●  |    |
| D3    |    |    | ●  | ●  | ●  |    |
| D4    |    |    | ●  |    | ●  | ●  |
| D5    |    |    |    | ●  | ●  | ●  |
| D6    | ●  |    |    |    | ●  | ●  |
| D7    |    | ●  |    |    | ●  | ●  |
| D8    | ●  | ●  |    |    |    | ●  |
| D9    |    | ●  |    | ●  |    | ●  |
| REV   |    | ●  | ●  | ●  |    |    |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2014-0177360 filed Dec. 10, 2014, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that improves power delivery performance and fuel economy by achieving nine forward speeds using minimized constituent elements.

2. Description of Related Art

In recent years, a rise in oil price causes dashing into unlimited competition for enhancing fuel efficiency.

As a result, research into reduction of weight and the enhancement of the fuel efficiency through down-sizing are conducted in the case of an engine and research for simultaneously securing operability and fuel efficiency competitiveness through multi-speeds are conducted in the case of an automatic transmission.

However, in the automatic transmission, as the number of speeds increase, the number of internal components increase, and as a result, mountability, transmission efficiency, and the like may still deteriorate and cost and weight may increase.

Accordingly, development of a planetary gear train which may bring about maximum efficiency with a small number of components may be important in order to increase a fuel efficiency enhancement effect through the multi-stages.

In this aspect, in recent years, 8 and 9-speed automatic transmissions tend to be implemented and the research and development of a planetary gear train capable of implementing more transmission steps has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that implements nine forward speeds and one reverse speed with a minimum configuration and reduces drag torque by minimizing non-operated friction elements while three friction elements operate in respective gear stages to improve power transmission performance and fuel efficiency.

According to various aspects of the present invention, a planetary gear train of an automatic transmission for a vehicle may include an input shaft into which power of an engine is input, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft including the first sun gear, selectively connected to the input shaft, and selectively connected to a transmission housing, a second rotational shaft including the first planet carrier and the second ring gear, and selectively connected to the transmission housing, a third rotational shaft including the second planet carrier, a fourth rotational shaft including the second sun gear and directly connected to the input shaft, a fifth rotational shaft including the first ring gear and the fourth sun gear, and selectively connected to the third rotational shaft, a sixth rotational shaft including the third ring gear and the fourth planet carrier, and selectively connected to the input shaft, a seventh rotational shaft including the third planet carrier and the fourth ring gear, and directly connected to an output shaft, and an eighth rotational shaft including the third sun gear and selectively connected to the transmission housing.

Each of the first, second, third, and fourth planetary gear sets may be a single pinion planetary gear set.

The planetary gear train may further include a first clutch interposed between the input shaft and the first rotational shaft, a second clutch interposed between the second rotational shaft and the fifth rotational shaft, a third clutch interposed between the input shaft and the sixth rotational shaft, a first brake interposed between the first rotational shaft and the transmission housing, a second brake interposed between the second rotational shaft and the transmission housing, and a third brake interposed between the eighth rotational shaft and the transmission housing.

A first forward speed may be achieved by operation of the second and third brakes and the second clutch, a second forward speed may be achieved by operation of the first and third brakes and the second clutch, a third forward speed may be achieved by operation of the third brake and the first and second clutches, a fourth forward speed may be achieved by operation of the third brake and the second and third clutches, a fifth forward speed may be achieved by operation of the first, second, and third clutches, a sixth forward speed may be achieved by operation of the first brake and the second and third clutches, a seventh forward speed may be achieved by operation of the second brake and the second and third clutches, an eighth forward speed may be achieved by operation of the first and second brakes and the third clutch, a ninth forward speed may be achieved by operation of the second brake and the first and third clutches, and a reverse speed may be achieved by operation of the second and third brakes and the first clutch.

According to various aspects of the present invention, a planetary gear train of an automatic transmission for a vehicle may include an input shaft into which power of an engine is input, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, and a fourth planetary gear set including a fourth sun gear, a fourth planetary carrier, and a fourth ring gear, in which the first sun gear may be selectively connected to the input shaft and selectively connected to a transmission housing, the first planet carrier and the second ring gear that are directly connected to each other may be selectively connected to the transmission housing, the second sun gear may be directly connected to the input shaft, the first ring gear and the fourth sun gear that are directly connected to each other may be selectively connected to the second planet carrier, the third ring gear and the fourth planet carrier that are directly connected to each other may be selectively connected to the input shaft, the third planet carrier and the fourth ring gear that are directly connected to each other may be directly connected to an output shaft, and the third sun gear may be selectively connected to the transmission housing.

The planetary gear train may further include a first clutch interposed between the input shaft and the first sun gear, a second clutch interposed between the first ring gear and the second planet carrier, a third clutch interposed between the input shaft and the fourth planet carrier, a first brake interposed between the first sun gear and the transmission housing, a second brake interposed between the first planet carrier and the transmission housing, and a third brake interposed between the third sun gear and the transmission housing.

Various embodiments of the present invention may achieve nine forward speeds by combining four planetary gear sets that are simple planetary gear sets with six frictional elements. Therefore, power delivery performance and fuel economy may be improved.

In addition, three friction elements operate at each speed, and as a result, a friction drag loss is decreased by minimizing the number of friction elements which do not operate. Therefore, drag torque and power loss may be reduced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of frictional elements at each speed in the exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
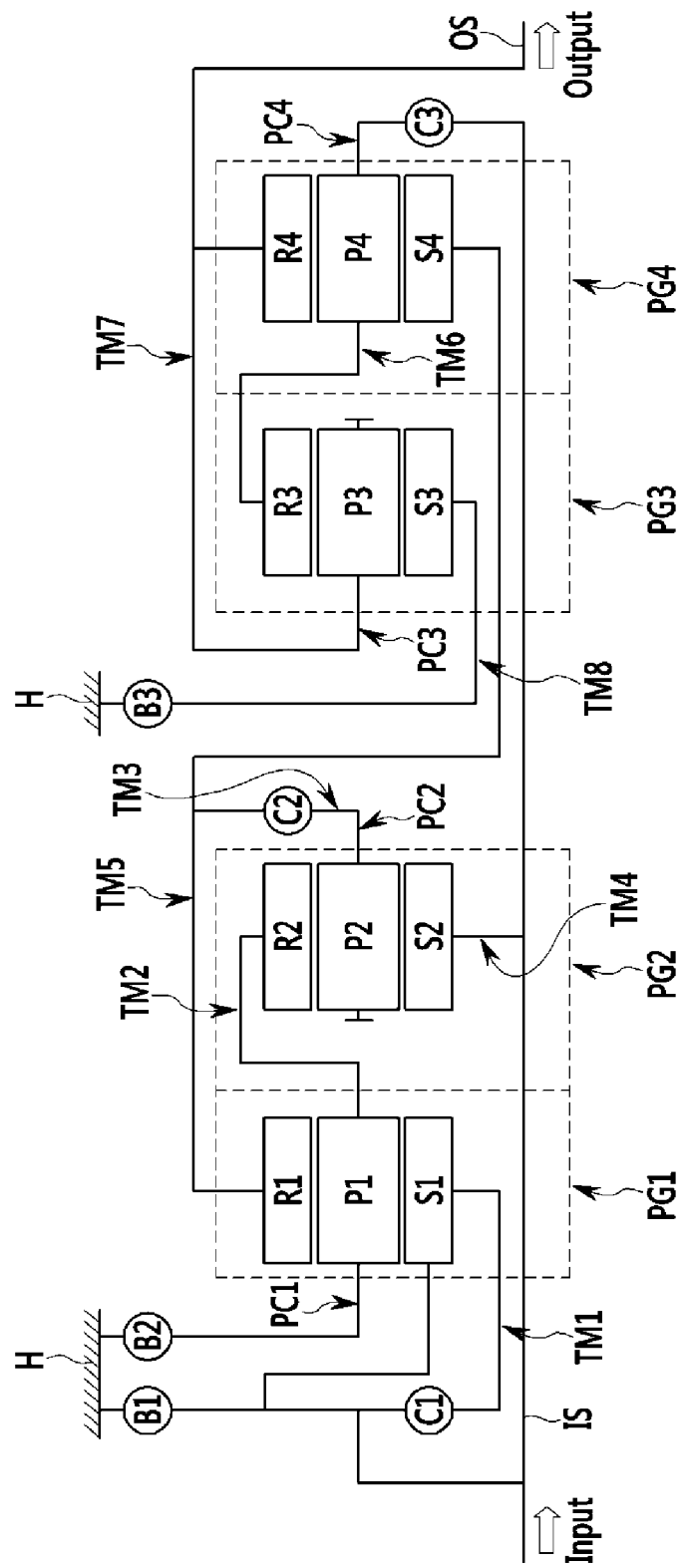
FIG. 1 is a schematic diagram of an exemplary planetary gear train according to the present invention.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, eight rotational shafts TM1 to TM8 that directly connect any one or two rotation elements of the first, second, third, and fourth planetary gear sets PG1, PG2, PG3, and PG4, six frictional elements C1 to C3 and B1 to B3, and a transmission housing H.

As a result, power input from the input shaft IS is changed by cooperation of the first, second, third, and fourth planetary gear sets PG1, PG2, PG3, and PG4, and the changed power is output through the output shaft OS.

In addition, the simple planetary gear sets are disposed in a sequence of the first, second, third, and fourth planetary gear sets PG1, PG2, PG3, and PG4 from an engine side.

The input shaft IS is an input member and power from a crankshaft of an engine is torque-converted through a torque converter to be input into the input shaft IS.

The output shaft OS is an output member and transmits driving power to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 as rotation elements thereof.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 as rotation elements thereof.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 as rotation elements thereof.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 as rotation elements thereof.

In the first, second, third, and fourth planetary gear sets PG1, PG2, PG3, and PG4, one or more rotation elements are directly connected to each other to operate with eight rotational shafts TM1 to TM8.

Configurations of the eight rotational shafts TM1 to TM8 will be described below.

The first rotational shaft TM1 includes the first sun gear S1, is selectively connected to the input shaft IS, and is selectively connected to the transmission housing H so as to be operated as a selective input element or a selective fixed element.

The second rotational shaft TM2 includes the first planet carrier PC1 and the second ring gear R2, and is selectively connected to the transmission housing H so as to be operated as a selective fixed element.

The third rotational shaft TM3 includes the second planet carrier PC2.

The fourth rotational shaft TM4 includes the second sun gear S2 and is directly connected to the input shaft IS so as to be always operated as an input element.

The fifth rotational shaft TM5 includes the first ring gear R1 and the fourth sun gear S4, and is selectively connected to the third rotational shaft TM3.

The sixth rotational shaft TM6 includes the third ring gear R3 and the fourth planet carrier PC4, and is selectively connected to the input shaft IS so as to be operated as a selective input element.

The seventh rotational shaft TM7 includes the third planet carrier PC3 and the fourth ring gear R4, and is directly connected to the output shaft OS so as to be operated as a final output element.

The eighth rotational shaft TM8 includes the third sun gear S3, and is selectively connected to the transmission housing H so as to be operated as a selective fixed element.

In addition, among the rotational shafts TM1 to TM8, four clutches C1, C2, C3, and C4 which are friction elements are disposed at the input shaft IS or portions where the rotational shafts are selectively connected to each other.

Further, among the rotational shafts TM1 to TM8, two brakes B1 and B2 which are the friction elements are disposed at portions selectively connected to the transmission housing H.

The first clutch C1 is interposed between the input shaft IS and the first rotational shaft TM1 so as to selectively connect the input shaft IS to the first rotational shaft TM1.

The second clutch C2 is interposed between the third rotational shaft TM3 and the fifth rotational shaft TM5 so as to selectively connect the third rotational shaft TM3 to the fifth rotational shaft TM5.

The third clutch C3 is interposed between the input shaft IS and the sixth rotational shaft TM6 so as to connect the input shaft IS to the sixth rotational shaft TM6.

The first brake B1 is interposed between the first rotational shaft TM1 and the transmission housing H so as to operate the first rotational shaft TM1 as the selective fixed element.

The second brake B2 is interposed between the second rotational shaft TM2 and the transmission housing H so as to operate the second rotational shaft TM2 as the selective fixed element.

The third brake B3 is interposed between the eighth rotational shaft TM8 and the transmission housing H so as to operate the eighth rotational shaft TM8 as the selective fixed element.

The frictional elements including the first, second, and third clutch C1, C2, and C3 and the first, second, and third brake B1, B2, and B3 may be multi-plate friction element of wet type that is operated by hydraulic pressure.

FIG. 2 is an operation chart of frictional elements at each speed in the planetary gear train according to various embodiments of the present invention.

As shown in FIG. 2, three frictional elements are operated at each speed in the planetary gear train according to various embodiments of the present invention.

A first forward speed D1 is achieved by operation of the second and third brakes B2 and B3 and the second clutch C2.

A second forward speed D2 is achieved by operation of the first and third brakes B1 and B3 and the second clutch C2.

A third forward speed D3 is achieved by operation of the third brake B3 and the first and second clutches C1 and C2.

A fourth forward speed D4 is achieved by operation of the third brake B3 and the second and third clutches C2 and C3.

A fifth forward speed D5 is achieved by operation of the first, second, and third clutches C1, C2, and C3.

A sixth forward speed D6 is achieved by operation of the first brake B1 and the second and third clutches C2 and C3.

A seventh forward speed D7 is achieved by operation of the second brake B2 and the second and third clutches C2 and C3.

An eighth forward speed D8 is achieved by operation of the first and second brakes B1 and B2 and the third clutch C3.

A ninth forward speed D9 is achieved by operation of the second brake B2 and the first and third clutches C1 and C3.

A reverse speed REV is achieved by operation of the second and third brake B2 and B3 and the first clutch C1.

Figure 3:
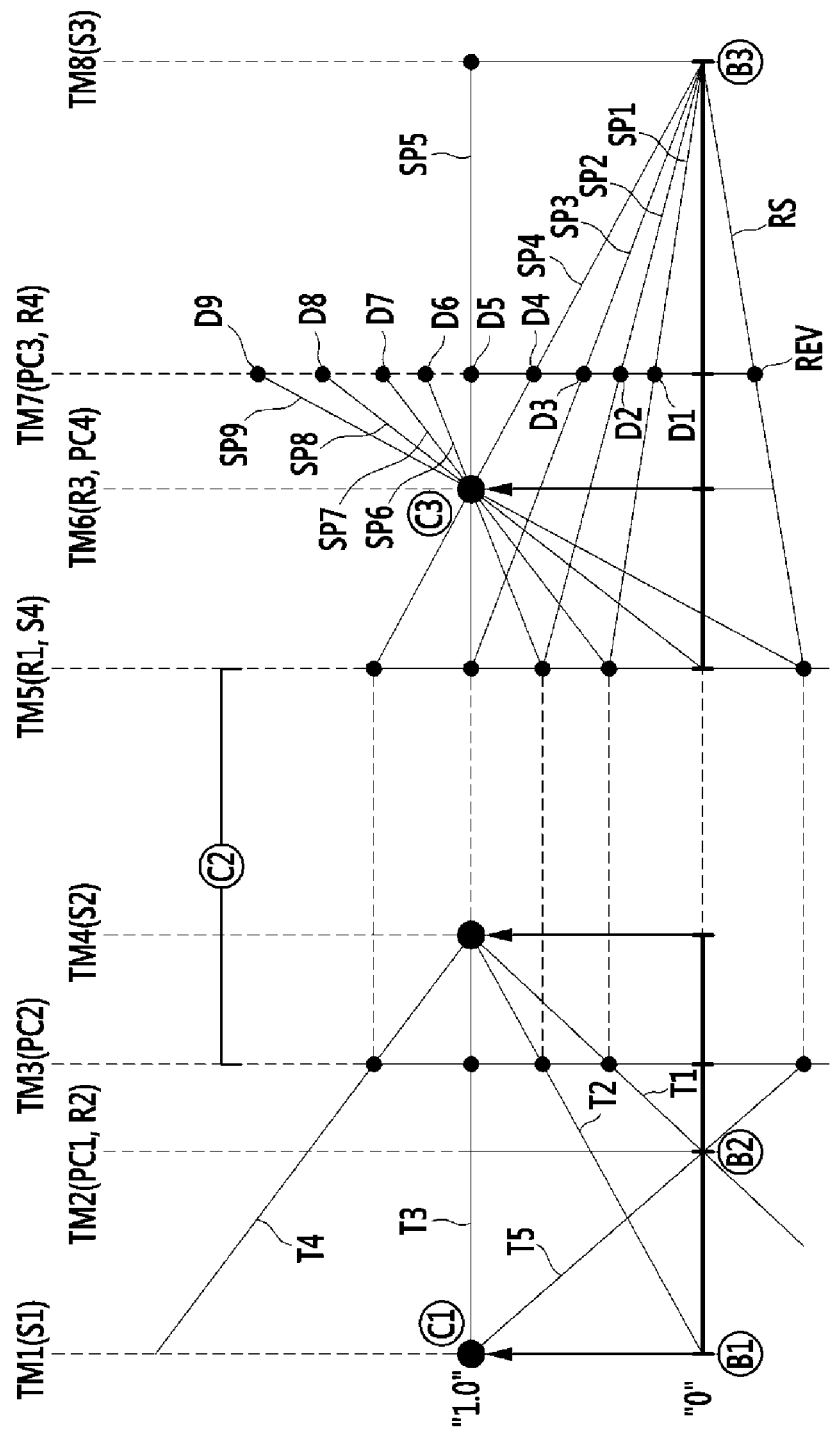
FIG. 3 is a lever diagram of an exemplary planetary gear train according to the present invention.

FIG. 3 is a lever diagram of a planetary gear train according to various embodiments of the present invention. Shifting processes of the planetary gear train according to various embodiments of the present invention is illustrated through a lever analysis method.

Referring to FIG. 3, eight vertical lines are set as the first rotational shaft TM1, the second rotational shaft TM2, the third rotational shaft TM3, the fourth rotational shaft TM4, the fifth rotational shaft TM5, the sixth rotational shaft TM6, the seventh rotational shaft TM7, and the eighth rotational shaft TM8 from the left to the right.

In addition, a lower horizontal line represents rotation speed of "0", and an upper horizontal line represents rotation speed of "1", that is the same rotation speed as the input shaft IS.

Intervals between the vertical lines are set according to each gear ratio (the teeth number of sun gear/the teeth number of ring gear) of each of the planetary gear sets PG1 to PG4.

Further, since setting of a rotational axis of the vertical line which is set by inter-combinations of the planetary gear sets is, of course, known to those skilled in the art of the planetary gear train, a detailed description thereof will be omitted.

Referring to FIG. 2 and FIG. 3, shifting processes for each speed in the planetary gear train according to various embodiments of the present invention will be described.

First Forward Speed

Referring to FIG. 2, the second and third brakes B2 and B3 and the second clutch C2 are operated at the first forward speed D1.

As shown in FIG. 3, in a state that a rotation speed of the input shaft IS is input to the fourth rotational shaft TM4, the second rotational shaft TM2 is operated as the fixed element by operation of the second brake B2. Therefore, rotation elements of the first and second planetary gear sets PG1 and PG2 form a first speed line T1 and changed rotation speed is output through the third rotational shaft TM3.

In addition, in a state that the rotation speed of the third rotational shaft TM3 is input to the fifth rotational shaft TM5 by operation of the second clutch C2, the eighth rotational shaft TM8 is operated as the fixed element by operation of the third brake B3. Therefore, the rotation elements of the third and fourth planetary gear sets PG3 and PG4 form a first shift line SP1, and D1 is output through the seventh rotational shaft TM7 that is the output element.

Second Forward Speed

The second brake B2 that was operated at the first forward speed D1 is released and the first brake B1 is operated at the second forward speed D2.

As shown in FIG. 3, in a state that a rotation speed of the input shaft IS is input to the fourth rotational shaft TM4, the first rotational shaft TM1 is operated as the fixed element by operation of the first brake B1. Therefore, rotation elements of the first and second planetary gear sets PG1 and PG2 form a second speed line T2 and changed rotation speed is output through the third rotational shaft TM3.

In addition, in a state that the rotation speed of the third rotational shaft TM3 is input to the fifth rotational shaft TM5 by operation of the second clutch C2, the eighth rotational shaft TM8 is operated as the fixed element by operation of the third brake B3. Therefore, the rotation elements of the third and fourth planetary gear sets PG3 and PG4 form a second shift line SP2, and D2 is output through the seventh rotational shaft TM7 that is the output element.

Third Forward Speed

The first brake B1 that was operated at the second forward speed D2 is released and the first clutch C1 is operated at the third forward speed D3.

As shown in FIG. 3, in a state that a rotation speed of the input shaft IS is input to the fourth rotational shaft TM4, rotation speed of the input shaft IS is input to the first rotational shaft TM1 by operation of the first clutch C1. Therefore, the first and second planetary gear sets PG1 and PG2 become direct-coupling states and rotation elements of the first and second planetary gear sets PG1 and PG2 form a third speed line T3.

In addition, in a state that the rotation speed of the third rotational shaft TM3 is input to the fifth rotational shaft TM5 by operation of the second clutch C2, the eighth rotational shaft TM8 is operated as the fixed element by operation of the third brake B3. Therefore, the rotation elements of the third and fourth planetary gear sets PG3 and PG4 form a third shift line SP3, and D3 is output through the seventh rotational shaft TM7 that is the output element.

Fourth Forward Speed

The first clutch C1 that was operated at the third forward speed D3 is released and the third clutch C3 is operated at the fourth forward speed D4.

As shown in FIG. 3, in a state that rotation speed of the input shaft IS is input to the sixth rotational shaft TM6 by operation of the third clutch C3, the eighth rotational shaft TM8 is operated as the fixed element by operation of the third brake B3. Therefore, the rotation elements of the third and fourth planetary gear sets PG3 and PG4 form a fourth shift line SP4, and D4 is output through the seventh rotational shaft TM7 that is the output element.

At this time, in a state that rotation speed of the input shaft IS is input to the fourth rotational shaft TM4, the third rotational shaft TM3 and the fifth rotational shaft TM5 are connected to each other by operation of the second clutch C2. Therefore, the rotation elements of the first and second planetary gear sets PG1 and PG2 form a fourth speed line T4 but have no effect on the shifting.

Fifth Forward Speed

The third brake B3 that was operated at the fourth forward speed D4 is released and the first clutch C1 is operated at the fifth forward speed D5.

As shown in FIG. 3, since the first, second, and third clutches C1, C2, and C3 are operated, rotation speed of the input shaft IS is input to the first rotational shaft TM1, the fourth rotational shaft TM4, and the sixth rotational shaft TM6. Therefore, the first, second, third, and fourth planetary gear sets PG1, PG2, PG3, and PG4 become direct-coupling states. Therefore, the rotation elements of the first and second planetary gear sets PG1 and PG2 form the third speed line T3, the rotation elements of the third and fourth planetary gear sets PG3 and PG4 form a fifth shift line SP5, and D5 is output through the seventh rotational shaft TM7 that is the output element.

Sixth Forward Speed

The first clutch C1 that was operated at the fifth forward speed D5 is released and the first brake B1 is operated at the sixth forward speed D6.

As shown in FIG. 3, in a state that a rotation speed of the input shaft IS is input to the fourth rotational shaft TM4, the first rotational shaft TM1 is operated as the fixed element by operation of the first brake Bl. Therefore, the rotation elements of the first and second planetary gear sets PG1 and PG2 form the second speed line T2, and the changed rotation speed is output through the third rotational shaft TM3.

In addition, in a state that the rotation speed of the third rotational shaft TM3 is input to the fifth rotational shaft TM5 by operation of the second clutch C2, rotation speed of the input shaft IS is input to the sixth rotational shaft TM6 by operation of the third clutch C3. Therefore, the rotation elements of the third and fourth planetary gear sets PG3 and PG4 form a sixth shift line SP6, and D6 is output through the seventh rotational shaft TM7 that is the output element.

Seventh Forward Speed

The first brake B1 that was operated at the sixth forward speed D6 is released and the second brake B2 is operated at the seventh forward speed D7.

As shown in FIG. 3, in a state that a rotation speed of the input shaft IS is input to the fourth rotational shaft TM4, the second rotational shaft TM2 is operated as the fixed element by operation of the second brake B2. Therefore, the rotation elements of the first and second planetary gear sets PG1 and PG2 form the first speed line T1, and the changed rotation speed is output through the third rotational shaft TM3.

In addition, in a state that the rotation speed of the third rotational shaft TM3 is input to the fifth rotational shaft TM5 by operation of the second clutch C2, rotation speed of the input shaft IS is input to the sixth rotational shaft TM6 by operation of the third clutch C3. Therefore, the rotation elements of the third and fourth planetary gear sets PG3 and PG4 form a seventh shift line SP7, and D7 is output through the seventh rotational shaft TM7 that is the output element.

Eighth Forward Speed

The second clutch C2 that was operated at the seventh forward speed D7 is released and the first brake B1 is operated at the eighth forward speed D8.

As shown in FIG. 3, since the first and second brakes B1 and B2 are operated, the first, second, and fifth rotational shafts TM1, TM2, and TM5 are operated as the fixed elements although rotation speed of the input shaft IS is input to the fourth rotational shaft TM4.

In a state that rotation speed of the input shaft IS is input to the sixth rotational shaft TM6 by operation of the third clutch C3, the fifth rotational shaft TM5 is operated as the fixed element. Therefore, the rotation elements of the third and fourth planetary gear sets PG3 and PG4 form an eighth shift line SP8, and D8 is output through the seventh rotational shaft TM7 that is the output element.

Ninth Forward Speed

The first brake B1 that was operated at the eighth forward speed D8 is released and the first clutch C1 is operated at the ninth forward speed D9.

As shown in FIG. 3, in a state that a rotation speed of the input shaft IS is input to the fourth rotational shaft TM4, rotation speed of the input shaft IS is input to the first rotational shaft TM1 by operation of the first clutch C1.

Since the second rotational shaft TM2 is operated as the fixed element by operation of the second brake B2 at this time, the rotation elements of the first and second planetary gear sets PG1 and PG2 form a fifth speed line T5, and inverse rotation speed is output through the fifth rotational shaft TM5 by rotation speed input into the first rotational shaft TM1.

In addition, rotation speed input into the fourth rotational shaft TM4 has no effect on the shifting because the third rotational shaft TM3 runs idling.

In a state that inverse rotation speed is input through the fifth rotational shaft TM5, rotation speed of the input shaft IS is input to the sixth rotational shaft TM6 by operation of the third clutch C3. Therefore, the rotation elements of the third and fourth planetary gear sets PG3 and PG4 form a ninth shift line SP9, and D9 is output through the seventh rotational shaft TM7 that is the output element.

Reverse Speed

The second and third brakes B2 and B3 and the first clutch C1 are operated at the reverse speed REV.

As shown in FIG. 3, in a state that a rotation speed of the input shaft IS is input to the fourth rotational shaft TM4, rotation speed of the input shaft IS is input to the first rotational shaft TM1 by operation of the first clutch C1.

Since the second rotational shaft TM2 is operated as the fixed element by operation of the second brake B2 at this time, the rotation elements of the first and second planetary gear sets PG1 and PG2 form a fifth speed line T5, and inverse rotation speed is output through the fifth rotational shaft TM5 by rotation speed input into the first rotational shaft TM1.

In addition, rotation speed input into the fourth rotational shaft TM4 has no effect on the shifting because the third rotational shaft TM3 runs idling.

In a state that inverse rotation speed is input through the fifth rotational shaft TM5, the eighth rotational shaft TM8 is operated as the fixed element by operation of the third brake B3. Therefore, the rotation elements of the third and fourth planetary gear sets PG3 and PG4 form a reverse shift line RS, and REV is output through the seventh rotational shaft TM7 that is the output element.

The planetary gear train according to various embodiments of the present invention may achieve nine forward speeds and one reverse speed by combining four planetary gear sets PG1, PG2, PG3, and PG4 with three clutches C1, C2, and C3 and three brakes B1, B2, and B3.

The planetary gear train according to various embodiments of the present invention may improve power delivery efficiency and fuel economy by achieving multiple-speeds of the automatic transmission.

In addition, since three friction elements operate at each speed and the number of non-operating friction elements is minimized, a friction drag loss is decreased. Therefore, drag torque and power loss may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft into which power of an engine is input;
   a first planetary gear set including a first sun gear, a first planetary carrier, and a first ring gear;
   a second planetary gear set including a second sun gear, a second planetary carrier, and a second ring gear;
   a third planetary gear set including a third sun gear, a third planetary carrier, and a third ring gear;
   a fourth planetary gear set including a fourth sun gear, a fourth planetary carrier, and a fourth ring gear;
   a first rotational shaft including the first sun gear, selectively connected to the input shaft, and selectively connected to a transmission housing;
   a second rotational shaft including the first planet carrier and the second ring gear, and selectively connected to the transmission housing;
   a third rotational shaft including the second planet carrier;
   a fourth rotational shaft including the second sun gear and directly connected to the input shaft;
   a fifth rotational shaft including the first ring gear and the fourth sun gear, and selectively connected to the third rotational shaft;
   a sixth rotational shaft including the third ring gear and the fourth planet carrier, and selectively connected to the input shaft;
   a seventh rotational shaft including the third planet carrier and the fourth ring gear, and directly connected to an output shaft; and
   an eighth rotational shaft including the third sun gear and selectively connected to the transmission housing.

2. The planetary gear train of claim 1, wherein each of the first, second, third, and fourth planetary gear sets is a single pinion planetary gear set.

3. The planetary gear train of claim 1, further comprising:
   a first clutch interposed between the input shaft and the first rotational shaft;
   a second clutch interposed between the second rotational shaft and the fifth rotational shaft;
   a third clutch interposed between the input shaft and the sixth rotational shaft;

a first brake interposed between the first rotational shaft and the transmission housing;

a second brake interposed between the second rotational shaft and the transmission housing; and a third brake interposed between the eighth rotational shaft and the transmission housing.

4. The planetary gear train of claim 3, wherein a first forward speed is achieved by operation of the second and third brakes and the second clutch, a second forward speed is achieved by operation of the first and third brakes and the second clutch, a third forward speed is achieved by operation of the third brake and the first and second clutches, a fourth forward speed is achieved by operation of the third brake and the second and third clutches, a fifth forward speed is achieved by operation of the first, second, and third clutches, a sixth forward speed is achieved by operation of the first brake and the second and third clutches, a seventh forward speed is achieved by operation of the second brake and the second and third clutches, an eighth forward speed is achieved by operation of the first and second brakes and the third clutch, a ninth forward speed is achieved by operation of the second brake and the first and third clutches, and a reverse speed is achieved by operation of the second and third brakes and the first clutch.

5. A planetary gear train of an automatic transmission for a vehicle, comprising:

an input shaft into which power of an engine is input;

a first planetary gear set including a first sun gear, a first planetary carrier, and a first ring gear;

a second planetary gear set including a second sun gear, a second planetary carrier, and a second ring gear;

a third planetary gear set including a third sun gear, a third planetary carrier, and a third ring gear; and a fourth planetary gear set including a fourth sun gear, a fourth planetary carrier, and a fourth ring gear, wherein the first sun gear is selectively connected to the input shaft and is selectively connected to a transmission housing, the first planet carrier and the second ring gear that are directly connected to each other are selectively connected to the transmission housing, the second sun gear is directly connected to the input shaft, the first ring gear and the fourth sun gear that are directly connected to each other are selectively connected to the second planet carrier, the third ring gear and the fourth planet carrier that are directly connected to each other are selectively connected to the input shaft, the third planet carrier and the fourth ring gear that are directly connected to each other are directly connected to an output shaft, and the third sun gear is selectively connected to the transmission housing.

6. The planetary gear train of claim 5, further comprising:

a first clutch interposed between the input shaft and the first sun gear;

a second clutch interposed between the first ring gear and the second planet carrier;

a third clutch interposed between the input shaft and the fourth planet carrier;

a first brake interposed between the first sun gear and the transmission housing;

a second brake interposed between the first planet carrier and the transmission housing; and a third brake interposed between the third sun gear and the transmission housing.

* * * * *